United States Patent [19]

Bibl

[11] Patent Number: 5,003,325
[45] Date of Patent: Mar. 26, 1991

[54] ELECTRIC FIELD PAPER STABILIZING SYSTEM FOR AN ELECTROGRAPHIC PLOTTER, PRINTER OR THE LIKE

[75] Inventor: Andreas Bibl, Los Altos, Calif.

[73] Assignee: Rastergraphics, Inc., Sunnyvale, Calif.

[21] Appl. No.: 467,905

[22] Filed: Jan. 22, 1990

[51] Int. Cl.$^5$ .................... G01D 15/24; B65H 5/00
[52] U.S. Cl. .................... 346/136; 271/193; 271/18.1
[58] Field of Search ............ 271/193, 18.1; 346/134, 346/136, 138

[56] References Cited

U.S. PATENT DOCUMENTS

| | | | |
|---|---|---|---|
| 3,571,678 | 3/1971 | Sezako et al. | 346/134 |
| 3,981,498 | 9/1976 | Fletcher | 271/193 |
| 4,023,894 | 5/1977 | Goel | 346/159 |
| 4,207,579 | 6/1980 | Gamblin et al. | 346/75 |
| 4,878,071 | 10/1989 | Bibl et al. | 346/157 |

FOREIGN PATENT DOCUMENTS

| | | | |
|---|---|---|---|
| 0258031 | 12/1985 | Japan | 271/193 |
| 0203169 | 9/1987 | Japan | 271/193 |

OTHER PUBLICATIONS

A. H. Platt, "Electrostatic Transport for Unfused Copies", Research Disclosure, 12/77, No. 16429.

Primary Examiner—Mark J. Reinhart
Assistant Examiner—Huan Tran
Attorney, Agent, or Firm—Lyon & Lyon

[57] ABSTRACT

An electric field paper stabilizing system for an electrographic plotter, printer, or the like includes a continuous transport belt for passing a recording medium in substantially a complete revolution past a writing head. The belt is conductive or has a conductive surface conformably coated with a minimally thin dielectric material of high dielectric strength and permittivity. A recording medium such as electrostatic writing paper has a conductive surface adjacent the dielectric coating on the conductive transport belt. Electrode means are provided in the dielectric coating for holding the paper at ground potential. A differential potential is applied between the back side of the paper and the conductive transport belt whereby the paper and belt function as parallel conductive plates of a capacitor. The electric field developed between the conductive paper and the belt provides a strong hold down force which immovably registers the paper to the belt. Because the entire back side of the paper is conductive and held at ground potential, the conductive side of the paper acts as a ground plane, preventing the strong electric field from interfering with other electric fields from the writing nibs which may be applied to the writing surface of the paper.

16 Claims, 2 Drawing Sheets

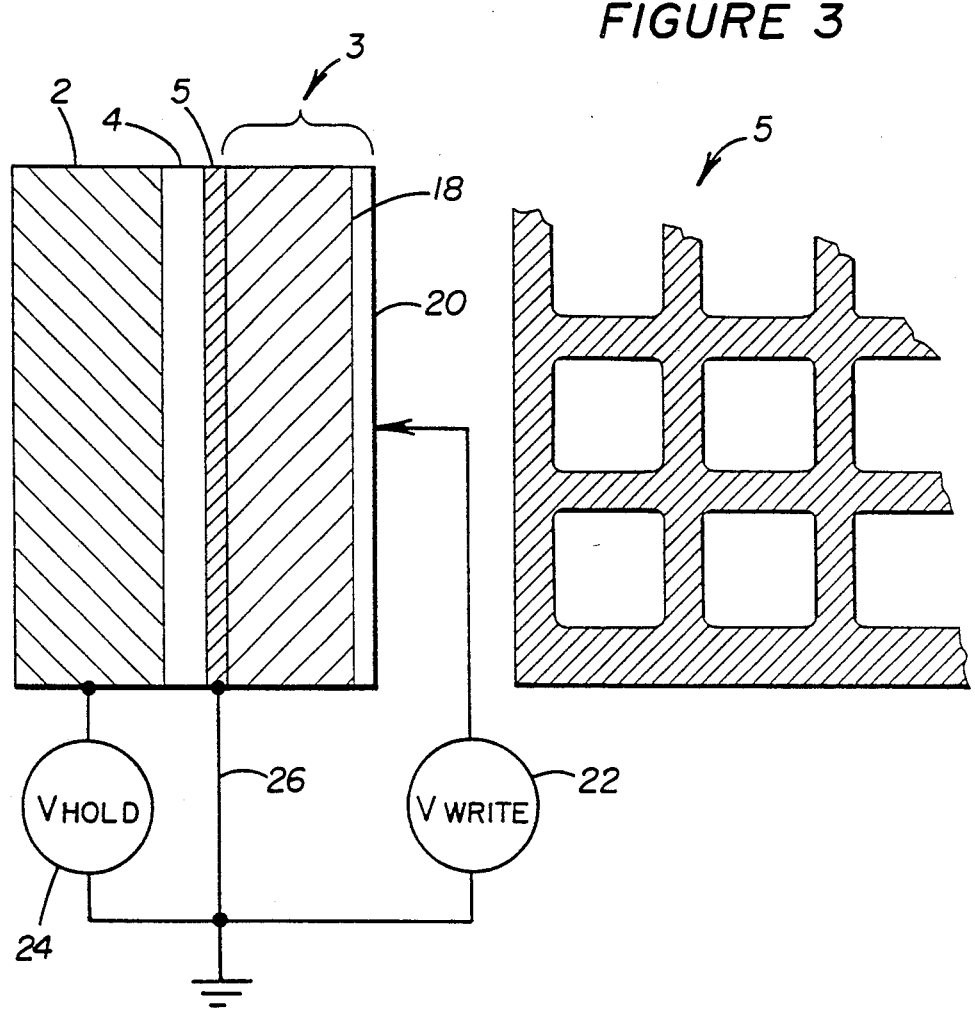

ELECTRIC FIELD PAPER STABILIZING SYSTEM FOR AN ELECTROGRAPHIC PLOTTER, PRINTER OR THE LIKE

BACKGROUND OF THE INVENTION

1. Field Of The Invention

This invention relates to electrographic writing systems and in particular to a device for generating an electric field of maximized intensity between a conductive transport belt and a recording medium supported thereon to thereby provide a simplified means for adhering and stabilizing a recording medium on a transport belt in a multipass, raster line printer, plotter or the like. The electric field paper stabilizing system according to the present invention employs a continuous, conductive transport belt having a changing radius of curvature for supporting a recording medium in substantially a complete revolution past a writing head and toner assembly. The transport belt and recording medium act as parallel conductive plates of a capacitor which are separated by a thin dielectric coating provided on the paper holding surface of the transport belt.

In an electrographic writing system such as an electrostatic plotter or printer, it is crucial to stabilize the paper with an extreme degree of precision with respect to a writing head and toner assembly so that the paper can be plotted on multiple writing passes. It is also necessary to keep a recording medium such as dielectric paper immovably stabilized during plotting operations in order to obtain high resolution and an improved degree of color to color registration.

Prior art methods for holding a sheet of paper to a transport belt in a plotter, printer or the like often teach the application of a vacuum to a recording medium by a vacuum plenum or vacuum generating means disposed on the underside of a porous or perforated belt. Examples of such prior art methods are shown in Gablin, et al., U.S. Pat. No. 4,207,579 or Goel, U.S. Pat. No. 4,023,894.

These methods have notable disadvantages. Because vacuum is applied to the paper only when the porous belt is positioned directly over a vacuum plenum, once the belt moves off the plenum the paper cannot be stabilized on the belt because the vacuum instantly escapes through the perforations or pores in the belt. The foregoing methods are inapplicable in a high speed plotter in which paper must be adhered to a continuous belt which makes multiple passes past a writing head because these methods of paper stabilization are unable to hold paper on a continuous transport belt as the belt moves over rollers.

The typical prior art vacuum hold down system is also mechanically extremely complex. Such a vacuum system requires a vacuum plenum or other means of producing a vacuum, vacuum pumps, vacuum hoses and flexible seals which must travel with the belt in order to achieve a continuous application of the vacuum to the recording medium. It is difficult to completely stabilize a recording medium on a transport belt in a plotter or printer to the need for a flexible, moving vacuum seal or other means for continually applying the vacuum to the underside of the paper as it travels on the belt. Because such flexible vacuum seals are continuously moving, they are subject to constant wear and are particularly susceptible to leaks, especially when the belt must travel at high speed.

Some prior art methods apply a vacuum to a recording medium by means of vacuum channels on a rotating belt. The vacuum is applied to the channels by hoses or a vacuum plenum which must rotate with the belt. It would be desirable to eliminate vacuum pumps, traveling vacuum hoses and flexible vacuum seals which are susceptible to leaking and which add undue mechanical complexity to a plotter or printer incorporating a moving belt.

Paper stabilizing systems are known which use electrostatic attraction for holding the paper to a plotting surface. U.S. Pat. No. 3,571,678 is an example of a prior art paper stabilizing apparatus for a flat bed pen plotter, recording drum or other supporting structure having a uniform surface. This prior art device includes a base comprising an insulating sheet. The insulating sheet has a thin metallic layer on its lower side which is adhesively supported on the supporting structure. The metallic layer forms an electrode. A semiconductor layer is disposed on the upper side of the insulating sheet. The top surface of the semiconductor layer further supports a conductive pattern comprising strips of conductive material such as metallic foil, sheet metal or even conductive paint. A rectangular edge frame of sheet metal is superimposed above the conductive pattern for applying a uniform voltage to all portions of the conductive pattern. A voltage potential is applied between the lower metallic layer and the frame. Paper disposed above the frame and conductive pattern is held on to the conductive pattern by electrostatic attraction. This method is somewhat complex and requires a semiconductor layer in order to discharge any frictional charge which may be generated due to friction as the paper is moved from the holding device. The semiconductor layer was also thought to be necessary in order to prevent any frictional charge from interfering with or impeding the paper attracting action.

The foregoing prior art method for using electrostatic attraction to hold paper to a rigid drum or bed is not believed adaptable to a modern high speed plotting system utilizing a continuous transport belt. Moreover, it would not be obvious to use such a system in an electrostatic plotter because the generated electrostatic field for holding the paper would interfere with the electrostatic writing field developed from the writing nibs. Therefore, what is needed is a simplified paper stabilizing system characterized by high reliability which would not be subject to loss of registration. Such a paper stabilizing system should be adaptable for stabilizing a recording medium in a high speed, high resolution electrostatic plotter. Such a system should desirably eliminate the mechanical complexity and unreliability of flexible, moving vacuum seals and vacuum hoses of prior art vacuum paper hold down systems.

The paper stabilizing system should be capable of stabilizing a recording medium against even minute dimensional and positional changes due to temperature and humidity. It is preferable that such a paper stabilizing system be incorporated in a plotter having a continuous transport belt configurable as an ellipsoid with a changing radius of curvature for passing the recording medium a complete revolution past a writing head and toning assembly on multiple writing passes. Such a system would maximize plotting speed and at the same time, maximize the surface area of the recording medium capable of being written upon while maintaining a highly compact plotter size.

SUMMARY OF THE INVENTION

In order to overcome the above discussed disadvantages of prior art paper holding systems, the present invention provides a greatly simplified apparatus for applying an extraordinarily strong, electric field hold down force for immovably stabilizing a recording medium in a high speed, non-multiplexed electrostatic plotter incorporating a continuous metal transport belt.

The paper stabilizing system according to the present invention maximizes electric field strength to completely and invariantly register paper or other conventional recording medium to a transport belt by employing the paper itself as one conductive plate of a capacitor. A metal transport belt supporting the recording medium acts as the other plate. The belt and recording medium are separated by a very thin coating of dielectric material which is disposed on the paper supporting surface of the belt. A thin pattern of metalization having an optimized area is provided in the dielectric layer. The surface area of the metalization is optimized such that the amount of metalization is just sufficient to hold the conductive paper at ground potential, but does not impinge upon the electric field lines between the paper and the belt. Means are provided for applying a high differential potential between the metal belt and the pattern of metalization on the dielectric layer.

The recording medium used in this invention comprises standard electrostatic recording paper which has its base treated with a salt solution. Thus, in accordance with one aspect of this invention, the paper itself acts as conductive parallel plate of a capacitor, the transport belt comprising the other plate. The voltage potential across the dielectric layer establishes an exceptionally strong electric field between the base of the paper and the belt. This electric field is of such intensity that the paper is immovably registered on the belt during repeated writing passes past an electrostatic writing head.

It will be appreciated that the prior art electrostatic paper holding systems could not employ the recording medium as one parallel plate of a capacitor as in the present invention because the recording medium could not be held at a fixed potential due to the multiplexed nature of the writing heads and the need to charge and discharge finite regions of the recording medium. In a prior art multiplexed electrostatic writing system, a recording medium, typically dielectric paper, is disposed between a writing stylus or nib and a back electrode. The back electrode in a multiplexed system is not a single electrode but rather an array of electrodes. The recording medium retains discrete electrostatically charged areas formed on its surface in response to electrical discharges from the writing electrodes. Subsequently, toner is applied to the recording medium and adheres to the charged areas by electrostatic attraction. In such a multiplexed system, the segments of the back electrode must be held at different potentials. This prevents holding the sheet of paper at a fixed potential or at ground potential. A multiplexed electrostatic writing system would inherently preclude a strong electrostatic attraction between the paper and the transport belt since a strong hold down field would cause interference between the electric charges on the surface of the recording medium and the electric fields on the array of electrodes. Accordingly, the present paper stabilizing system was not possible until the advent of a non-multiplexed writing head such as the described in U.S. patent application Ser. No. 07/341,79 for an "INTEGRATED THICK FILM ELECTROSTATIC WRITING HEAD."

Previously, it was also believed impractical to use an electric field hold down system in an electrostatic plotter because the extremely high voltage for developing the electric field necessary to hold the paper to the belt would interfere with or impinge upon the writing fields developed at the writing nibs, and thus degrade resolution and writing performance. However, in accordance with one aspect of the invention, the back side of the paper or other recording medium is conductive and is held at ground potential to act as a ground plane. A negative writing voltage is applied on the writing side of the paper or recording medium and a high voltage is maintained on the conductive transport belt supporting the recording medium.

It has been found that the high differential potential between the transport belt and the back side of the conductive medium does not interfere with the writing voltage because the recording medium is essentially a grounded conductor. Thus, in accordance with one aspect of the invention, when the back side of the recording medium is held at ground potential, this acts as a ground plane or shield to prevent interference between the electric field on the writing surface and the electric field developed from the transport belt on the other side of the grounded paper.

The present invention also maximizes the holding force by maximizing the energy stored in a capacitor formed by the conductive back side of the recording medium, the conductive transport belt and the thin dielectric coating on the belt. The holding force is directly proportional to the stored electrical energy in the capacitor. Thus, to maximize the holding force, the voltage and capacitance must be maximized.

In accordance with the present invention, the material chosen for the dielectric coating is preferably a material having a high dielectric strength and permittivity. The surface area of the dielectric coating is coextensive with the paper supporting surface of the conductive transport belt. The paper is stabilized over its entire surface in contact with the belt and, in a preferred embodiment, makes a complete revolution with the continuous belt past the electrostatic writing head assembly. Accordingly, the area of the dielectric is coextensive with the paper and the transport belt. Thus, the common area of the parallel plates and dielectric is also maximized. In addition, the dielectric coating on the belt is extremely thin (1-2 mils.) and therefore minimizes the distance between the recording material and the transport belt. The foregoing factors maximize capacitance values and the strength of the electric field developed between the recording medium and transport belt.

The electric field according to the present invention provides an exceptionally strong holding force which rigidly adheres the recording medium to the supporting surface of the transport belt. The electric field developed is so strong that the paper can be invariantly registered to a continuous belt even as the radius of curvature of the belt changes.

The apparatus according to the present invention provides a simplified means, in comparison with prior art vacuum or electrostatic hold down systems, for enabling the writing electrodes or nibs of a multipass color raster line printer or plotter or the like to be tracked precisely to preceding passes at an accuracy equal to one half the distance between the writing nibs of prior art plotters, thereby achieving a doubling of the density of dots and superior resolution over standard prior art plotters.

It will be appreciated that the recording medium is held rigidly by the electric field according to the present invention without expansion or contraction due to humidity changes or mechanical deformation as is common in prior art electrostatic plotters. Writing and toning can be accomplished without the paper becoming distorted in any way during multiple successive writing passes.

BRIEF DESCRIPTION OF THE DRAWINGS

FIG. 2 is a cross sectional view of an electric field paper stabilizing system according to the present invention.

FIG. 3 is a top view of an exemplary means for grounding the recording medium according to the present invention.

DETAILED DESCRIPTION OF A PREFERRED EMBODIMENT

Figure 1:
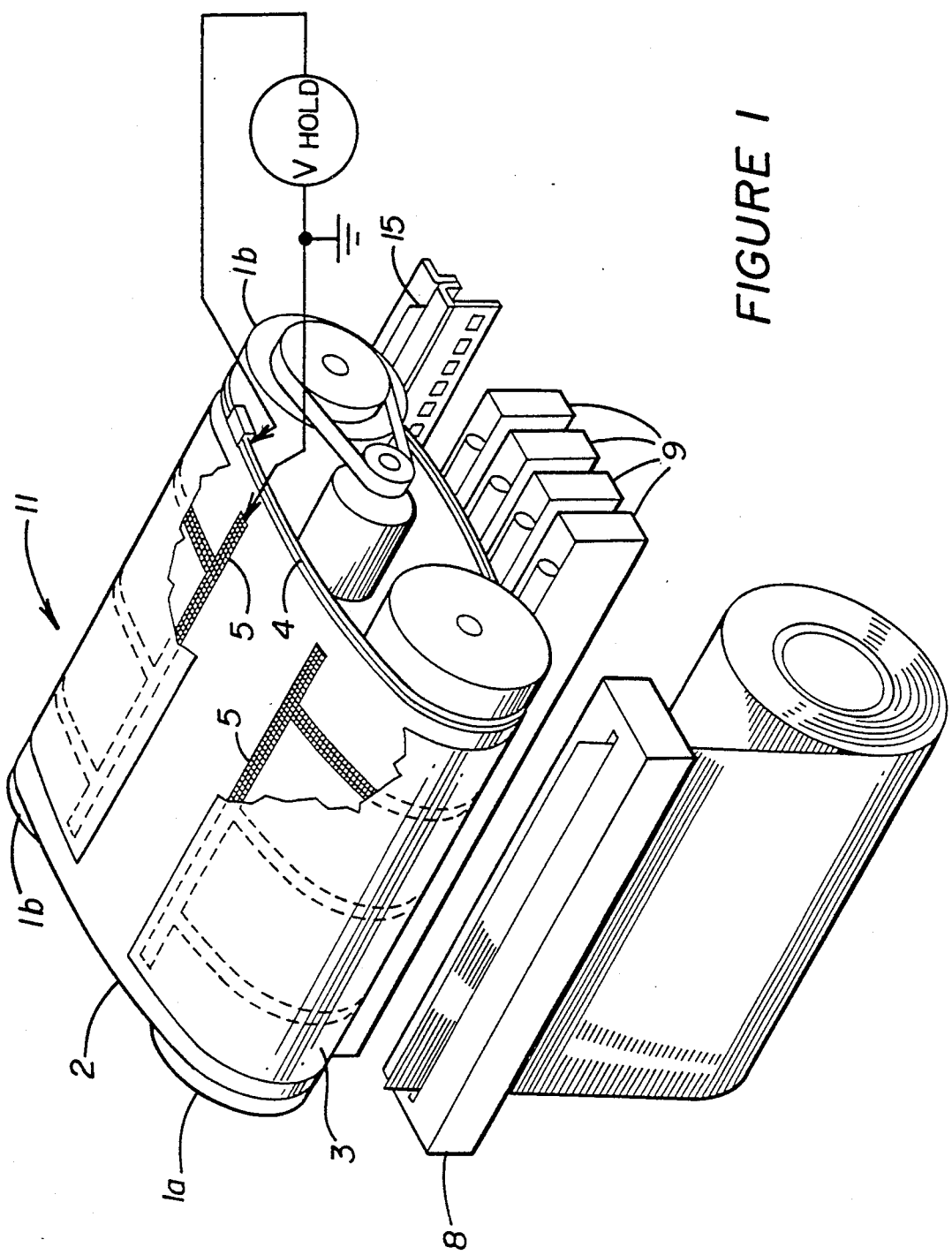
FIG. 1 is a perspective view of an exemplary multipass raster line printer, plotter or the like incorporating the electric field paper stabilizing system of the present invention.

Referring to FIG. 1, an apparatus according to the present invention includes a multipass color raster line plotter or printer 11 employing electrographic writing technologies. The present invention is applicable to provide simplified and improved registration of a recording medium, and consequently enhanced resolution, in an electrostatic plotter or similar device.

In the preferred embodiment, the plotter 11 is an electrostatic plotter incorporating a continuous transport belt means 2 for transporting and for stabilizing a recording medium 3 in invariant registration with respect to a writing head 15 and a toning assembly 9.

The transport belt means 2 is preferably a continuous, thin, flexible but stable conductive belt consisting of a stainless steel or nickel material having a thickness of approximately 0.002–0.005 inches. Transport belt 2 is preferably an endless belt suspended in an ellipsoidal configuration by two rollers 1a and 1l, respectively. Rollers 1a and 1b comprise a means for passing the transport belt 2 and the recording medium 3 stabilized thereon in substantially a complete revolution past the writing head 15 and toning assembly 9 as plotting operations take place. In accordance with the present invention, the recording medium or paper 3 is attached to the transport belt 2 by an exceptionally strong electric field after being applied to the transport belt 2 through a cutting and feed mechanism 8.

In the preferred embodiment, the recording medium 3 comprises conventional electrostatic recording paper. Conventional electrostatic recording paper 3 is treated with a salt solution on its undersurface which is placed in contact with the transport belt 2. The salt ions make the paper conductive and allow the paper to act as a grounded conductive plate. The top surface of the paper has a dielectric layer placed on it during manufacturing for holding an electrostatic charge image. Holding the back side of the paper constantly at ground potential makes the paper function as a ground plane which shunts electric field lines of the strong electric field to ground. This advantageously prevents the electric field which develops the hold down force from interfering with electrostatic charge images on the surface of the paper.

Referring also to FIGS. 2 and 3 the conductive transport belt 2 is provided with an extremely thin dielectric layer 4 on its paper supporting surface. The dielectric layer 4 comprises a thin coating of dielectric material preferably having a thickness of 0.001–0.002 inches which is coated upon and conformably covers the paper supporting surface of the transport belt 2. The dielectric coating preferably comprises any suitable insulating material having a high relative permittivity such as Kapton. The dielectric material must also have a high degree of dielectric strength so that it will not break down when a high differential potential is applied between the conductive back side of recording medium 3 and the conductive belt 2. It will be appreciated that the greater the permittivity of the dielectric material, the greater the capacitance and consequently the greater the stored energy.

In accordance with the present invention, the holding force is proportional to the stored electrical energy in the capacitor which is formed by the parallel conductive plates comprising the back side of the recording medium 3, transport belt 2 and the dielectric material 4 interposed between the plates. The stored electrical energy which provides the holding force may be expressed in terms of the following equation:

$$\text{Energy} = \tfrac{1}{2}CV^2_{HOLD}$$

In the above equation, C equals the capacitance and $V_{HOLD}$ equals the potential applied between the transport belt 2 and the back side of the recording medium 3. Similarly, capacitance may be expressed as follows:

$$C = \frac{k\epsilon A}{d}$$

Here, A represents the common area of the plates and the dielectric material, d is the distance between the plates, k is the dielectric constant of the dielectric coating 4 and $\epsilon$ is the permittivity of free space.

An optimally strong electric field is generated between the conductive transport belt 2 and recording medium 3 in accordance with the following factors. The capacitance or stored electrical energy is maximized by providing an extremely thin dielectric coating 4 on the supporting surface of the transport belt 2 adjacent the back side of the recording medium 3. Preferably, the dielectric material should have a high dielectric strength such as Kapton. The dielectric has an optimal thickness in a range of 0.001–0.002 inches to minimize the distance between the capacitor plates comprising recording medium 3 and transport belt 2.

It will be appreciated that maximizing the common area of the dielectric coating and the capacitor plates and minimizing the distance between the plates maximizes the stored electrical energy and thereby the holding force developed between the paper or other recording medium 3 and transport belt 2.

In accordance with another aspect of this invention, an electrode means 5 for holding the recording medium 3 at a fixed potential or preferably at ground potential is provided in the dielectric layer 4. Electrode means 5 has a connection with ground and with a voltage source 24 through a line 26. In a preferred embodiment, the electrode means 5 is a conductive material such as copper tape or the like having a thickness not exceeding one half mil (0.0005 inches). The electrode means 5 may be any planar conductor which is provided within the dielectric medium 4 such that the surface of the dielectric medium and the surface of the electrode means 5 are integral and flush with one another. The electrode means 5 also may be applied to the dielectric coating 4 by a sputtering process. Electrode means 5 is disposed for applying a potential to the underside of the recording medium 3 which is supported on the transport belt 2 in adjacent contact with the dielectric coating 4 and electrode means 5. Electrode means 5 in a preferred embodiment also provides a means for holding the recording medium at ground potential through line 26.

It is important that the surface area of electrode means 5 be optimized with respect to the dielectric coating 4. That is, the total area of the electrode means 5 must comprise only a small percentage of the total surface area of the dielectric coating 4. In a preferred embodiment, electrode means 5 may comprise a conductive grid as shown in FIG. 3. What is important is that electrode means 5 has a sufficient contacting surface with recording medium 3 such that the entire recording medium is held at ground potential. At the same time, the total surface area of electrode means 5 with respect to the dielectric coating 4 must be maintained at a minimum so as not to impinge upon and diminish the intensity of the electric field accomplishing the hold down force.

A voltage source 24 is connected with electrode means 5 by a line 26 according to well known techniques, such as with conductive brushes. Voltage source 24 also is connected with the conductive transport belt 2, by any convenient method and provides a means for applying a differential potential to the conductive transport belt 2 such that a strong electric field is established between the recording medium 3 and the transport belt 2. The coulomb force exerted on the recording medium 3 by the electric field developed between the conductive recording medium 3 and the conductive transport belt 2 is of such intensity that the recording medium 3 is strongly held in an invariant position on the dielectrically coated surface 4 of transport belt 2.

The electric field stabilizing system according to the present invention differs from known prior art systems in that the paper or other recording medium 3 is itself a conductor and acts, along with conductive transport belt 2, as a parallel plate of a capacitor. The potential necessary to establish an electric field of requisite intensity between the paper 3 and belt 2 is in a range from 2,000–4,000 volts.

The present invention provides an advantage over known electrostatic paper hold down systems in that it enables the entire surface of the recording medium 3 adjacent the transport belt 2 to be conductive and held at ground potential. Holding the back side of recording medium 3 at ground potential prevents interference with other electric fields developed from the writing nibs in an electrostatic plotter. In the present invention, the top surface of the recording medium 3 acts as a dielectric layer which can accept an electrostatic charge from a writing head 15. Preferably, a negative writing voltage is applied on the writing side of recording medium 3 through the writing head 15. It has been found that the high voltage on the transport belt 2 which generates the electric field between the conductive back side of recording medium 3 and transport belt 2 does not interfere with the writing operations on the top surface of the recording medium 3 because the recording medium 3 is grounded. That is, the undersurface of paper 3 which is supported on transport belt 2 and held at ground potential acts as a ground plane or shield to prevent interference between the electric fields developed from the writing nibs on the writing surface of the paper 3 and the electric hold down field on the other side of the ground plane. The present invention provides the advantage of producing an extremely strong electric hold down field for immovably stabilizing paper or other recording medium 3 to a transport belt 2 without distorting electrographic writing fields applied to the surface of the paper. It will be appreciated that the present invention was not possible using known prior art electrostatic hold down systems because the entire recording medium could not be constantly held at ground or at a fixed potential. Thus, in the prior art any strong electric field developed from the transport belt would distort electrographic writing fields applied to the writing surface of the paper.

The electric field paper stabilizing system according to the present invention is a greatly simplified system wherein the recording medium 3 and transport belt 2 effectively act as conductive, parallel plates of a capacitor. The features of the present invention also function to maximize capacitance values to thereby produce an extremely strong electric field which enables the paper or other recording medium to be perfectly and immovably registered to a continuous transport belt 2 even as the recording medium 3 and transport belt 2 are doubled back over rollers 1a and 1b as the transport belt 2 and recording medium 3 make a complete revolution past a writing head 5 and toning assembly 9 as plotting operations are in progress. The apparatus according to the present invention also enables color plotting to be achieved simply and without the expense of a more complicated writing head, due to the high degree of paper stability guaranteed by the electric field holddown system.

While a presently-preferred embodiment of the invention has been disclosed, those of ordinary skill in the art will, from an examination of the within disclosure and drawings be able to configure other embodiments of the invention. These other embodiments are intended to fall within the scope of the present invention which is to be limited only by the scope of the appended claims.

What is claimed is:

1. An apparatus for precisely stabilizing a recording medium with respect to a writing head in a multipass electrographic plotter, printer or the like comprising:
   transport means having a conductive supporting surface for stabilizing a recording medium thereon and for moving said recording medium one or more revolutions past said writing head;
   a dielectric coating provided on said supporting surface of said transport means;
   planar electrode means provided integrally in the surface of said dielectric coating for holding said recording medium at ground potential and having a connection with a voltage source for providing a differential potential between said transport means and said recording medium at ground potential and having a connection with a voltage source for providing a differential potential between said transport means and said recording medium to establish an electric field between said recording medium and said transport means such that the coulomb force exerted on said recording medium by said electric field holds said recording medium to said transport means in an invariant position with respect to said writing head.

2. An apparatus according to claim 1 wherein said electrode means comprises planar strips flush with the surface of said dielectric coating.

3. An apparatus according to claim 1 wherein the potential applied by said voltage source is in a range from 2,000 to 4,000 volts.

4. An apparatus according to claim 1 wherein said electrode means is configurable as a conductive grid provided in said dielectric and having a total surface area with respect to the area of said dielectric coating such that said electric field generated between said belt and said recording medium is not impinged.

5. An apparatus according to claim 1 wherein said dielectric coating has a thickness in a range of between 1 and 2 mils (0.001–0.002 inches).

6. An apparatus according to claim 1 wherein said electrode has a thickness not exceeding ½ mil (0.0005 inches).

7. An electric field paper stabilizing system for an electrographic plotter, printer or the like incorporating a continuous transport belt means for stabilizing a recording medium supported thereon in invariant registration during one or more revolutions with respect to a writing head comprising:
a recording medium having a writing surface and an opposed conductive surface;
a transport belt having a conductive surface for supporting said recording medium;
a dielectric material interposed between said supporting surface of said transport belt and said conductive recording medium for insulating said recording medium from said transport means;
planar electrode means provided in said dielectric layer and said electrode means having a planar surface integral with the surface of said dielectric layer adjacent said recording medium for coating said recording medium at ground potential;
means for applying a differential potential between said transport belt and said electrode means such that a strong electric field is established between said recording medium and said transport belt and the coulomb force exerted on said recording medium by said electric field adheres said recording medium to said transport means in a substantially invariant position.

8. An electric field hold down system for precise registration of paper or other recording medium to a transport belt having a conductive paper supporting surface in a multipass plotter, printer or the like comprising:
a recording medium having a writing surface and an opposed conductive surface;
a writing head means for applying an electric charge to said writing surface of said recording medium;
a dielectric material provided on said paper supporting surface of said transport belt;
grounding means provided integrally in said dielectric material for holding said conductive surface of said recording medium uniformly at ground potential and for preventing interference with the applied electric fields on said writing surface; and
means for applying a differential potential between said recording medium conductive surface and said paper supporting surface of said transport belt such that said recording medium conductive surface and said paper supporting surface said transport belt act as parallel conductive plates of a capacitor having a maximized capacitance.

9. An apparatus as in claim 8 wherein said means for holding and conductive surface of said recording medium at ground potential includes conductive grid provided in the surface of said dielectric material for contacting said recording medium conductive surface and having an optimal surface area which is sufficient to uniformly ground said recording medium while not impinging upon said electric field.

10. An apparatus as in claim 8 wherein said means for applying a differential potential includes a voltage source having a connection with said transport belt conductive surface and said grounding means.

11. A method for providing an electric field hold down force for invariantly stabilizing paper or other recording medium on a transport belt having a conductive paper supporting surface with respect to a writing head in a plotter, printer or the like comprising the steps of:
providing a thin layer of dielectric material on the conducting surface of said transport belt;
providing a thin planar electrode means in said surface of said dielectric layer such that the planar surface of said electrode means is flush with said surface of said dielectric layer;
using said electrode means to hold said recording medium at ground potential;
applying a differential potential between said electrode means and said conductive surface of said transport belt such that a strong electric field is developed between said transport belt and said recording medium such that the coulomb force exerted on said recording medium by said electric field rigidly and invariantly adheres said recording medium to said belt.

12. A method as in claim 11 wherein said step of providing a thin planar layer of conductive material in said surface of said dielectric includes the step of optimizing the surface area of said conductive material with respect to the surface area of said dielectric layer such that the recording medium is held at ground potential and electric field lines between the recording medium and transport belt are not impinged upon.

13. A method as in claim 11 wherein said step of providing a thin coating of dielectric material includes the step of providing a dielectric layer thin enough to minimize the distance between said recording medium and said transport belt but having sufficient thickness to prevent breakdown of the dielectric upon application of a potential of up to 4,000 volts.

14. In an electrostatic plotter or the like incorporating a transport belt having a conductive surface for moving a recording medium with respect to a writing head, the improvement comprising:
a dielectric coating disposed on said conductive surface of said transport belt;
a recording medium having a writing surface and an opposed conductive surface in contact with said dielectric coating;
means disposed in said surface of said dielectric coating for maintaining said conductive surface of said recording medium at ground and for applying a differential potential between said recording medium conductive surface and said conductive surface of said transport belt such that the capacitance of said dielectric is maximized and wherein said conductive surface of said recording medium and said transport belt act as parallel capacitor plates to invariantly stabilize said recording medium on said transport belt.

15. An apparatus as in claim 14 wherein said means for applying a differential potential between said recording medium and said transport belt for producing an electric field comprises:

electrode means provided flush with said dielectric coating for grounding said recording medium;

voltage source means for applying a first potential to said electrode means and an opposite potential to said transport belt.

16. An apparatus for providing a maximized electric hold down force between a transport belt and a recording medium supported thereon for multiple passes past an electrostatic writing head comprising:

a transport belt having a conductive surface;

a dielectric coating provided coextensively on the surface of said transport belt, characterized by high permittivity and minimal thickness;

a planar grounding means provided in the surface of said dielectric coating for holding said contacting surface of said recording medium at ground potential and for preventing interference with the electric fields from said writing head on said writing surface;

means for applying a differential potential between said belt and said recording medium such that said belt and said recording medium act as parallel conductive plates of a capacitor and said recording medium is invariantly stabilized on said dielectric coating.

* * * * *